(12) United States Patent
Sakamoto et al.

(10) Patent No.: US 6,298,967 B1
(45) Date of Patent: Oct. 9, 2001

(54) ROTATING COIL ELECTROMAGNETIC

(75) Inventors: Hiroyasu Sakamoto, Chiryu; Junichi Ohguchi, Toyoake; Yuuichi Aoki, Chita-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/492,532

(22) Filed: Jan. 27, 2000

(30) Foreign Application Priority Data

Jan. 27, 1999 (JP) .................................................. 11-018854

(51) Int. Cl.⁷ ............................ F16D 27/02; H01R 39/38
(52) U.S. Cl. ....................................... 192/84.951; 310/247
(58) Field of Search ............................ 192/84.95, 84.951; 310/239, 247

(56) References Cited

U.S. PATENT DOCUMENTS

| 3,718,211 | * | 2/1973 | Schubert et al. ................ 192/84.2 X |
| 4,190,141 | * | 2/1980 | Bennett et al. .................. 192/84.951 |
| 4,337,855 | * | 7/1982 | Bennett ....................... 192/84.951 X |
| 6,012,563 | * | 1/2000 | Aoki et al. ....................... 192/84.951 |

FOREIGN PATENT DOCUMENTS

| 57-22423 | * | 5/1982 | (JP) . |
| 1-131028 |   | 9/1989 | (JP) . |
| 2-54928  |   | 4/1990 | (JP) . |

* cited by examiner

Primary Examiner—Rodney H. Bonck
(74) Attorney, Agent, or Firm—Pillsbury Winthrop LLP

(57) ABSTRACT

An electromagnetic coil is fixed in a rotor through an insulation member. A slip-ring rotating with a rotor and a brush supplying electric current to the slip-ring are disposed radially inside a boss portion of a compressor housing. The slip ring is attached to the rotor through a slip-ring supporter, and the brush is supported by the boss portion through a brush supporter. The brush supporter includes a cylindrical sleeve radially inside the brush, which extends axially outwardly farther than a slide surface between the slip-ring and the brush.

7 Claims, 8 Drawing Sheets

ROTATING COIL ELECTROMAGNETIC

CROSS REFERENCE TO RELATED APPLICATION

This application is based on and incorporates herein by reference Japanese Patent Application No. Hei. 11-18854 filed on Jan. 27, 1999.

BACKGROUND OF THE INVENTION

1. Field of the Invention:

The present invention relates to an electromagnetic clutch suitable for use in a compressor of an automotive air conditioning system.

2. Description of Related Art:

JP-U-1-131028 and JP-U-2-54928 disclose an electromagnetic clutch in which an electromagnetic coil is provided in a rotor.

Applicants also filed a U.S. patent application Ser. No. 09/132,643 that discloses a coil rotating electromagnetic clutch suitable for use in a compressor of an automotive air conditioning system. In this patent application, slip-rings and brushes sliding with respect to the slip-rings are disposed in a space inside a cylindrical boss portion of the compressor housing, and an electric current is supplied to the electromagnetic coil through the slip-rings and the brushes.

However, in this coil rotating electromagnetic clutch, lubrication oil leaking out from a lip-seal sticks to a rotational shaft of the compressor. The oil flows axially frontwardly along the rotational shaft, and reaches the inside of the slip-rings and the brushes. Then, the oil splashes outwardly due to the centrifugal force of the rotational shaft, and sticks to slide surfaces between the slip-rings and the brushes.

When the oil sticks to the slide surfaces between the slip-rings and the brushes, abrasive material is deposited at the end of the brushes due to adhesion of the oil, thereby abnormally wearing the brushes.

This abnormal wear of the brushes reduces the life-span of the brushes, and increases the electric resistance at the slide surfaces, thereby decreasing electric conduction from the brushes to the slip-rings.

SUMMARY OF THE INVENTION

An object of the present invention is to provide a rotating coil clutch in which abnormal wear of a brush caused by adhesion of lubrication oil is prevented.

According to a first aspect of the present invention, a slip-ring rotating with a rotor is attached in the rotor. A brush supplying electric current to the slip-ring is supported by a brush supporter fixed to a fixed member. The brush supporter includes a substantially cylindrical sleeve radially inside the brush, which extends axially outwardly farther than a slide surface between the slip-ring and the brush. That is, the cylindrical sleeve covers the inner side of the slide surface, and effectively prevents oil on a rotational shaft from splashing toward the slide surface due to centrifugal force.

As a result, abnormal wear of the brush caused by adhesion of the oil to the slide surface is prevented, and the electric resistance at the slide surface does not increase, thereby improving electric conduction thereat.

According to a second aspect of the present invention, the brush supporter is disposed between an inner periphery of a cylindrical boss portion axially protruding from a housing of a rotary machine and a rotational shaft of the rotary machine. As the slip-ring and the brush are disposed inside the boss potion, the entire coil rotating electromagnetic clutch is compact. Further, as the brush supporter is placed just outside the rotational shaft, the slip-ring and the brush are disposed near the rotational center of the clutch. Thus, the circumferential speed of the slide surface is small, thereby improving the life-span of the brush.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
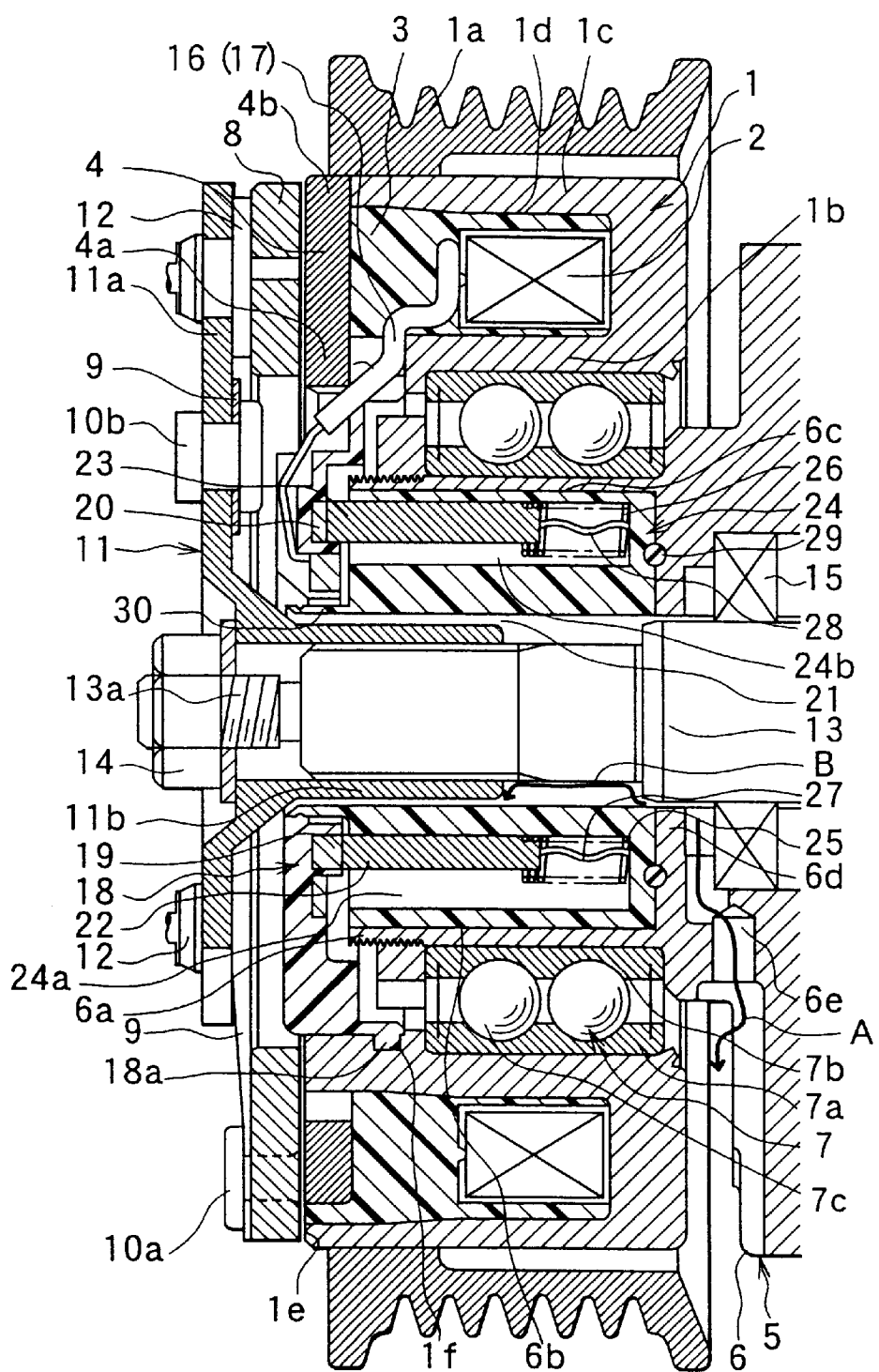
FIG. 1 is cross-sectional view showing an electromagnetic clutch (first embodiment)

In the first embodiment, an electromagnetic clutch is attached to a refrigerant compressor 5 of an automotive air conditioning system. FIG. 1 shows a cross-sectional view of the electromagnetic clutch.

The electromagnetic clutch includes a rotor 1, an electromagnetic coil 2, a friction plate 4, a ball bearing 7, an armature 8, and a hub 11.

The rotor 1 includes a pulley 1a around which a multistage V-belt (not illustrated) is wrapped, and rotates with the vehicle engine through the V-belt. The rotor 1 is made of magnetic material such as low carbon steel, and is formed into a cross-sectional U-shaped double-ring to have an inner cylindrical portion 1b, an outer cylindrical portion 1c, and a ring-like concave portion 1d therebetween. The rotor 1 further defines a friction surface 1e at its axial front end.

The electromagnetic coil 2 is installed in the concave portion 1d of the rotor 1. The electromagnetic coil 2 is wound around a bobbin (not illustrated) made of resin, and is fixed to the concave portion 1d through an insulation member 3 made of resin. Thus, the electromagnetic coil 2 rotates together with the rotor 1.

The friction plate 4 is made of magnetic material such as low carbon steel, and is formed as a ring. The friction plate 4 includes a plurality of projections 4a protruding radially inwardly and projections 4b protruding radially outwardly. The friction plate 4 is fixed to the axial front ends (left end in FIG. 1) of the inner and outer cylindrical portions 1b and 1c at these projections 4a and 4b.

The compressor 5 includes a front housing 6 disposed at the electromagnetic clutch. The front housing 6 is made of aluminum, and integrally defines a cylindrical boss portion 6a protruding axially frontwardly. In this embodiment, the compressor 5 is a refrigerant compressor for an automotive air conditioning system, and may be any of the well-known swash plate compressor, vane compressor, scroll compressor, or the like.

A ball bearing 7 is inserted into the inner periphery of the rotor 1. The rotor 1 is rotatably supported on the cylindrical boss portion 6a of the front housing 6 through the ball bearing 7. The ball bearing 7 includes an outer race 7a fixed to the inner periphery of the rotor 1, an inner race 7b fixed to the outer periphery of the boss portion 6a, and balls 7c rotatably supported between the outer and inner races 7a and 7b.

The armature 8 is placed facing to the friction surface 1e of the rotor 1 and the friction plate 4 with a predetermined slight gap. The armature 8 is made of magnetic material such as iron and formed as a ring-shaped plate. When the electromagnetic coil 2 is not energized, the armature 8 is held by the spring force of plural plate springs 9 to be separated by the predetermined slight gap from the friction surface 1e of the rotor 1.

The plate springs 9 are long and thin. One end of each plate spring 9 is connected to the armature 8 by a rivet 10a, and another end thereof is connected to the hub 11 by a rivet 10b.

The hub 11 is made of iron, and includes a disc portion 11a and a cylindrical portion 11b. A stopper 12 made of elastic material such as rubber is attached to the radially outer area of the disc portion 11a. When the electromagnetic coil 2 is not energized, the stopper 12 sets the axial position of the armature 8. Further, the armature 8 is axially pushed from the rear surface of the disc portion 11a toward the rotor 1 by the thickness of the stopper 12, so that the plate spring 9 elastically transforms. Thus, a spring force arises in the plate spring 9, and holds the armature 8 at the axial predetermined position when the clutch is not energized.

The cylindrical portion 11b of the hub 11 is spline-connected to a rotational shaft 13 of the compressor 5. Further, a nut 14 is screwed to a front-end external thread 13a of the rotational shaft 13 to connect the hub 11 to the rotational shaft 13. A lip seal 15 is provided between the front housing 6 and the rotational shaft 13 to prevent lubrication oil and refrigerant in the compressor 5 from leaking outside.

A circuit supplying an electric current to the electromagnetic coil 2 rotating with the rotor 1 will be explained. In the present embodiment, a positive slip-ring 19, a negative slip-ring 20, and brushes 22, 23 are provided inside the compressor boss portion 6a, to conduct electric current to the coil 2.

In the concave portion 1d of the rotor 1, a wind start terminal and a wind end terminal of the electromagnetic coil 2 are taken out toward the friction surface 4 (armature 8) from the bobbin. A positive electrode side lead 16 is connected to one of these terminals, and a negative electrode side lead 17 is connected to the other terminal. The leads 16 and 17 are disposed symmetrically at about 180 degree intervals in the circumferential direction. Here, the positive side lead 16 is shown in FIG. 1, but the negative side lead 17 is not shown in FIG. 1.

A slip-ring supporter 18 is provided inside the rotor 1. The slip-ring supporter 18 is made of electric insulation material such as resin, and extends in the radial direction of the rotor 1. The positive slip-ring 19 and the negative slip-ring 20 are insert-formed at the inner area of the slip-ring supporter 18. The diameter of the positive stop-ring 19 is set smaller than the diameter of the negative slip-ring 20. Both slip-rings 19 and 20 are concentrically disposed inside the boss portion 6a.

The outer periphery 18a of the slip-ring supporter 18 is adhered to a concave groove 1f formed in the inner cylindrical portion 1b of the rotor 1. Thus, the slip-ring supporter 18 is fixed to the inner cylindrical portion 1b, and rotates with the rotor 1.

Both slip-rings 19 and 20 are made of conductor metal such as copper. The positive slip-ring 19, disposed radially inward, includes a positive electrode terminal (not illustrated), and the negative slip-ring 20, disposed radially outward, includes a negative electrode terminal (not illustrated). The positive and negative electrode terminals are integrally cut-formed or press-formed in the positive and negative slip-rings 19 and 20 respectively.

The end of the positive electrode side lead 16 is mechanically connected to the positive electrode terminal of the positive slip-ring 19 and soldered. Thus, the positive slip-ring 19 is mechanically and electrically connected to the positive electrode side lead 16. Similarly, the negative slip-ring 20 is also mechanically and electrically connected to the negative electrode side lead 17.

A cylindrical space 21 is formed between the cylindrical portion 11b of the hub 11 and the inner surface of the boss portion 6a. The positive and negative side brushes 22, 23 and a brush supporter 24 are disposed in the space 21.

Figure 2:
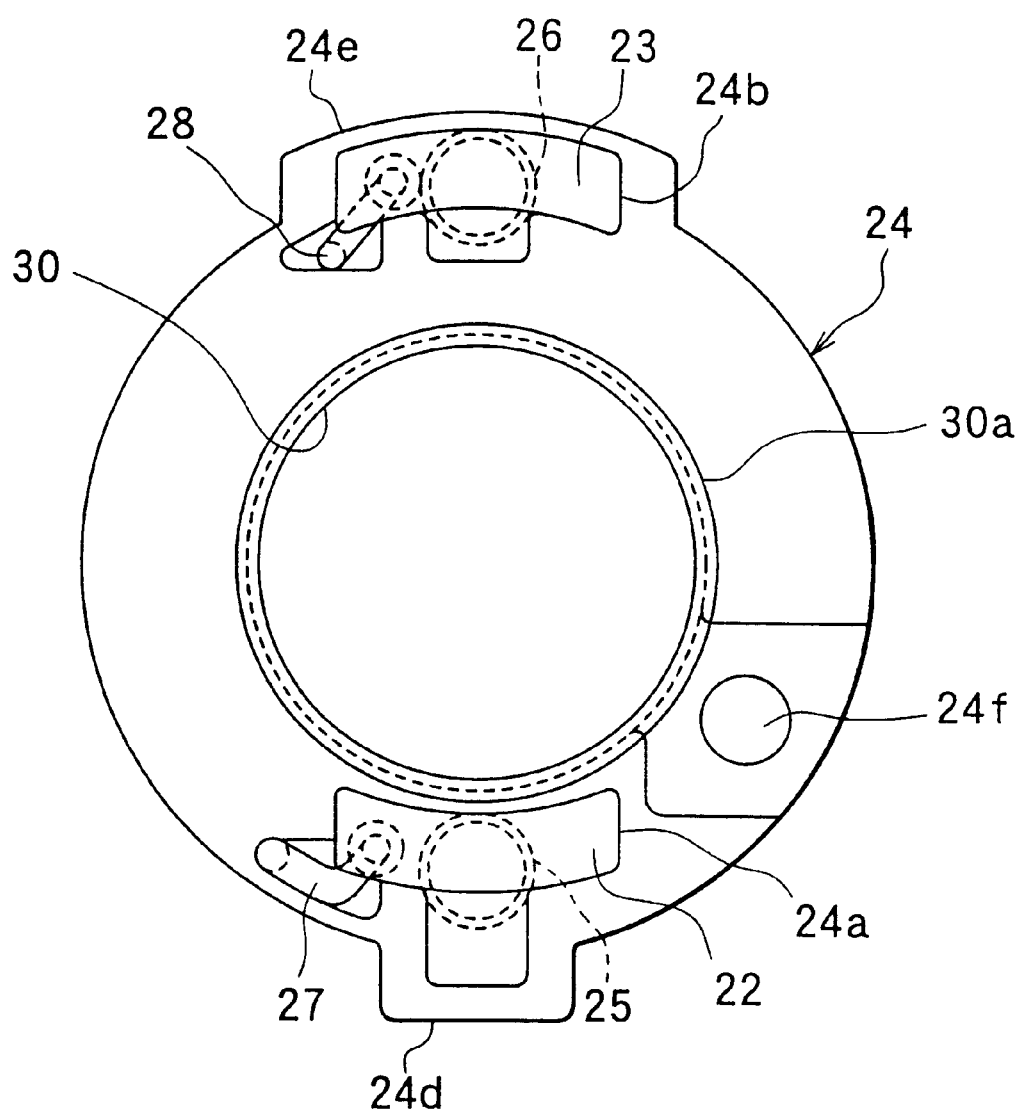
FIG. 2 is a front view showing a brush supporter (first embodiment)
Figure 3:
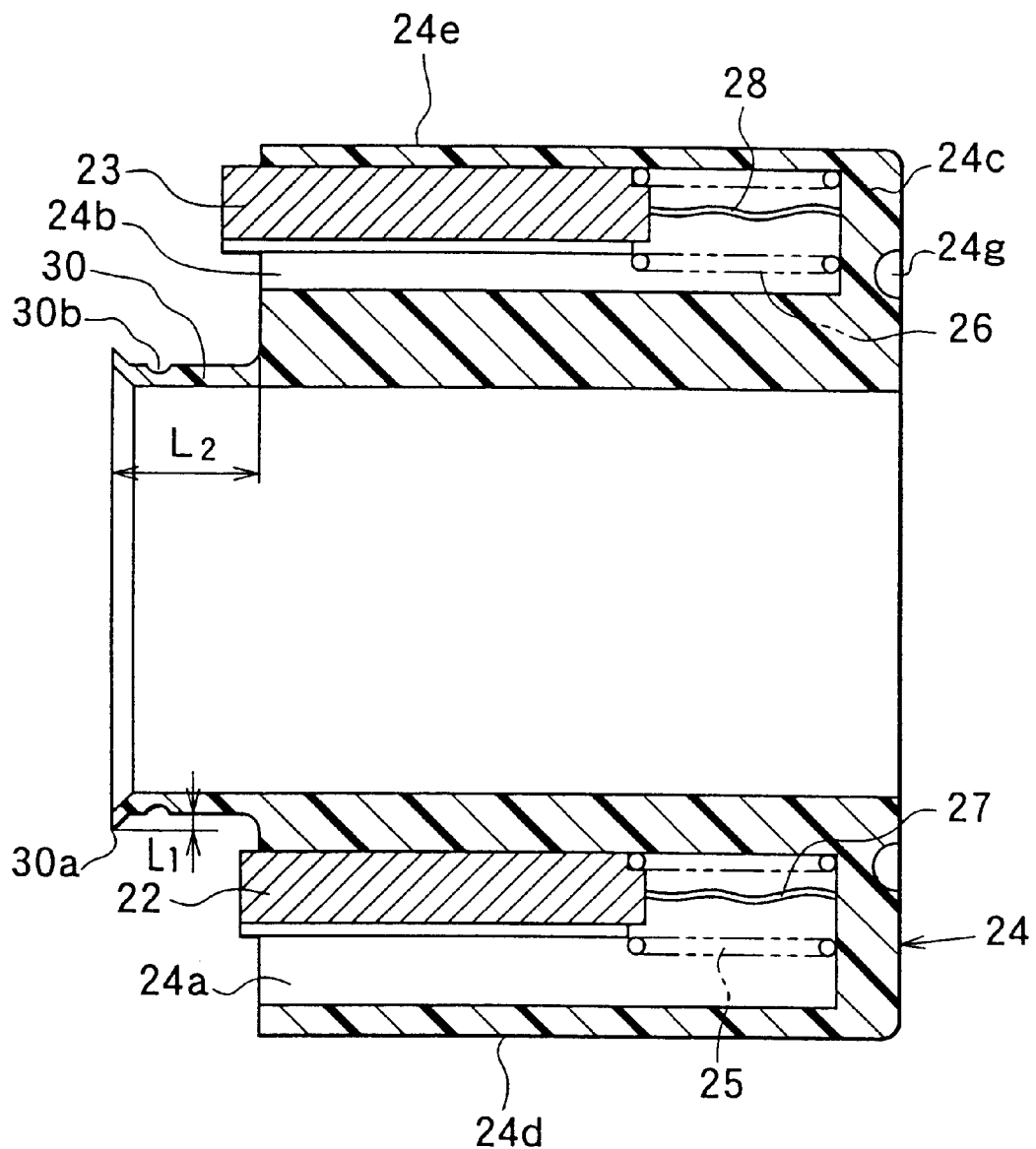
FIG. 3 is a cross-sectional view showing a brush supporter (first embodiment)

FIGS. 2 and 3 show the brushes 22, 23 and the brush supporter 24. FIG. 2 is a front view showing the brushes 22, 23 and the brush supporter 24 when viewed from the left side in FIG. 1, and FIG. 3 is a vertical cross-sectional view. The brush supporter 24 is made of electric insulation material such as resin, and includes a ring-shaped bottom surface 24c. As shown in FIG. 2, the brush supporter 24 includes two cross-sectional arc-shaped brush installation concave portions 24a and 24b at about 180 degree intervals in the circumferential direction thereof. As shown in FIGS. 1 and 3, the axial dimensions (depths) of the brush installation concave portions 24a and 24b are sufficiently long (deep) to hold brushes 22 and 23. The ring-shaped bottom surface 24c forms the bottoms of the concave portions 24a and 24b.

The brushes 22 and 23 are formed into cross-sectional arc shape and are positioned in the brush installation concave portions 24a and 24b respectively. The positive side brush 22 is installed in one brush installation concave portion 24a to slide in the axial direction. A coil spring 25 is provided between the rear end of the positive side brush 22 and the bottom surface 24c of the brush installation concave portion 24a to urge the brush 22 frontwardly. Thus, the front end of the positive side brush 22 is biased against the positive slip-ring 19 by the spring force of the coil spring 25.

Similarly, the negative side brush 23 is installed in the other brush installation concave portion 24b to slide in the axial direction. A coil spring 26 is provided between the rear end of the negative side brush 23 and the bottom surface 24c of the brush installation concave portion 24b to urge the brush 23 frontwardly. Thus, the front end of the negative side brush 23 is biased against the negative slip-ring 20 by the spring force of the coil spring 26.

The brush supporter 24 has two projections 24d and 24e, which extend in the radial direction over the length of the brush supporter 24, at the outer surface thereof where the brush installation concave portions 24a and 24b are formed. The projections 24d and 24e are formed symmetrically at 180 degree circumferential intervals. The boss portion 6a has two grooves 6b and 6c (see FIG. 1) at the inner surface thereof, into which the projections 24d and 24e are installed. In this way, the brush supporter 24 is circumferentially positioned with respect to the inner surface of the boss portion 6b. The brush supporter 24 is fastened to the front housing 6 by screwing a thread in a tapped hole 24f shown in FIG. 2.

A positive side lead 27 and a negative side lead 28 are electrically connected to the positive side brush 22 and the negative side brush 23, respectively. Each of the other ends of the leads 27 and 28 extends toward the compressor 5 through the bottom surface 24c of the brush installation concave portion 24a and 24b, and is electrically connected to an outside control circuit intermitting the electromagnetic coil 2.

The front housing 6 includes a ring-like weir 6d at the axial front side of the lip-seal 15. The ring-like weir 6d inwardly protrudes toward the outer surface of the rotational shaft 13. Further, the front housing 6 includes an oil discharge hole 6e at the axial rear side of the ring-like weir 6d. Lubrication oil leaking from the lip-seal 15 is downwardly discharged through the hole 6e as denoted by arrow A.

As shown in FIG. 3, the bottom surface 24c of the brush supporter 24 includes a ring-like groove 24g at the rear end (compressor 5 side) thereof. An O-ring 29 made of elastic material such as rubber is provided in the groove 24g. The O-ring 29 is pressed and held between the bottom surface 24c of the brush supporter 24 and the front end of the front housing 6.

As shown in FIGS. 2 and 3, the brush supporter 24 integrally includes a cylindrical sleeve 30 at the inside of the brushes 22 and 23. The ring-like sleeve 30 protrudes axially frontwardly from slide surfaces between the slip-rings 19, 20 and the brushes 22, 23.

The ring-like sleeve 30 includes an edge 30a at the front end thereof. The edge 30a is formed into a cross-sectional acute angle shape. Here, the edge 30a protrudes radially outwardly from the outer surface of the main portion of the sleeve 30 by a predetermined length L1.

The ring-like sleeve 30 further includes a circle groove 30b near the edge 30a. The circle groove 30b is formed at the rear side of the edge 30a, and extends entirely in the circumferential direction of the sleeve 30.

An operation of above-described electromagnetic clutch will be explained.

The rotor 1 is rotatably supported on the outer periphery of the boss portion 6a through the bearing 7. Thus, when the vehicle engine (not illustrated) rotates, the rotation force thereof is transmitted to the pulley 1a through the V-belt, and the rotor 1 and electromagnetic coil 2 rotate.

The leads 16 and 17, the slip-ring supporter 18, and the slip-rings 19 and 20 rotate with the rotation of the rotor 1 and the electromagnetic coil 2. In contrast, the brushes 22 and 23, the brush supporter 24, and the coil springs 25 and 26 are fixed to the boss portion 6a, and do not rotate. Thus, the front surfaces of the brushes 22 and 23 are press-contacted to the rotating slip-rings 19 and 20 by the spring force of the coil springs 25 and 26, and slide with respect to the slip-rings 19 and 20.

When the outside control circuit (not illustrated) closes a relay for operating the compressor 5, the electric voltage of a vehicle battery is impressed across the electromagnetic coil 2 through the electric supply circuit, and electric current is supplied to the coil 2. Then, the armature 8 is magnetically attracted to the friction surface 1e of the rotor 1 and the friction plate 4 against the axial elastic force (leftward force in FIG. 1) of the plate spring 9.

As a result, the rotor 1, the armature 8, the plate spring 9, the rivets 10a and 10b, and the hub 11 rotate together. Thus, the rotation of the rotor 1 is transmitted to the rotational shaft 13 through the hub 11, and the compressor 5 operates.

To stop the operation of the compressor 5, the outside control circuit opens the relay to disenergize the electromagnetic coil 2. As a result, the axial elastic force of the plate spring 9 separates the armature 8 from the friction surface 1e of the rotor 1 and the friction plate 4, thereby disconnecting the rotor 1 from the shaft 13 of the compressor 5. As a result, the operation of the compressor 5 is stopped.

Some lubrication oil in the compressor 5 may leak through the lip-seal 15, and flows axially frontwardly. Most of the leaking oil is interrupted by the ring-like weir 6d, and flows downwardly through the oil discharge hole 6e as denoted by arrow A. A part of the leaking oil flows through a slight gap between the ring-like weir 6d and the rotational shaft 13, and flows frontwardly along the rotational shaft 13 as denoted by arrow B.

The leaking oil denoted by arrow B further axially frontwardly flows along the outer surface of the cylindrical portion 11b of the hub 11, and reaches the inside of the slide surfaces between the slip-rings 19, 20 and the brushes 22, 23.

However, according to the present embodiment, the brush supporter 24 includes the cylindrical sleeve 30 protruding inside the brushes 22, 23 and axially frontwardly rather than the slide surfaces between the slip-rings 19, 20 and the brushes 22, 23. Thus, the leaking oil on the outer surface of the cylindrical portion 11b splashes due to centrifugal force and sticks to the inner wall of the sleeve 30.

In this way, the sleeve 30 prevents the leaking oil from splashing toward the brushes 22, 23 directly.

The leaking oil reaches the edge 30a formed at the axial front end of the sleeve 30, then moves along the edge 30a to the lower area thereof due to its weight. The leaking oil gathers at the lower front end of the edge 30a to form a drop, and the oil-drop drips down due to the gravity.

Here, it is possible that a part of the oil drop reaches the axial rear side (brush 22 side) of the sleeve 30 due to surface tension. However, according to the present embodiment, the edge 30a is formed into a cross-sectional acute angle shape and protrudes radially outwardly from the outer surface of the main portion of sleeve 30 by a predetermined length L1. Thus, the oil is directed away from the axial rear side of the sleeve 30, and drips from the lower end of the edge 30a with certainty.

Further, according to the present embodiment, the circle groove 30b is formed at the rear side of the edge 30a. Thus, even when the leaking oil flows toward the axial rear side of the sleeve 30, the oil is stored in the groove 30b. Then, the oil gathers again to form an oil-drop, and the oil-drop drips down due to the gravity.

The oil drips from the front end area of the sleeve 30 and passes through a gap between the armature 8 and the plate spring 9 to be discharged outside the electromagnetic clutch.

Further, according to the present embodiment, the O-ring 29 is press-installed between the front housing 6 and the bottom surface 24c of the brush supporter 24. Thus, the leaking oil is prevented from passing through a gap between the brush supporter 24 and the front housing 6 and flowing toward the slide surfaces of the brushes 22, 23.

As described above, the leaking oil is prevented from reaching the slide surfaces of the brushes 22, 23 with certainty.

In the present embodiment, the edge 30a is formed to protrude radially outwardly from the outer surface of the main sleeve 30 by the predetermined length L1. Thus, when the brush supporter 24 is molded, it is slightly difficult to axially pull out a die because the edge 30*a* must be transformed radially inwardly.

For overcoming this problem, a plurality of slits may be circumferential formed on the cylindrical sleeve 30, so that the sleeve 30 is constructed by plural arc members. Thereby, each of the plural arc members can elastically transform respectively, so that the die is easily pulled out after molding.

That is, the sleeve 30 is not restricted to be a complete cylindrical shape, and may be a substantial cylindrical shape having above described slits.

In the present embodiment, as shown in FIG. 1, the sleeve 30 protrudes from the brush supporter 24 to penetrate through the slip-ring supporter 18 and axially extends to the outside of the slip-ring supporter 18. Alternatively, the protrusion amount L2 (see FIG. 3) may be less than that as in FIG. 1. Namely, it is sufficient that the sleeve 30 extends to the frontward rather than the slide surfaces between the slip-rings 19, 20 and the brushes 22, 23 by a predetermined amount (for example, more than 1 mm).

Further, the O-ring 29 may be disposed between the outer surface of the brush supporter 24 and the inner surface of the boss portion 6*a* of the front housing 6.

(Second Embodiment)

Figure 4:
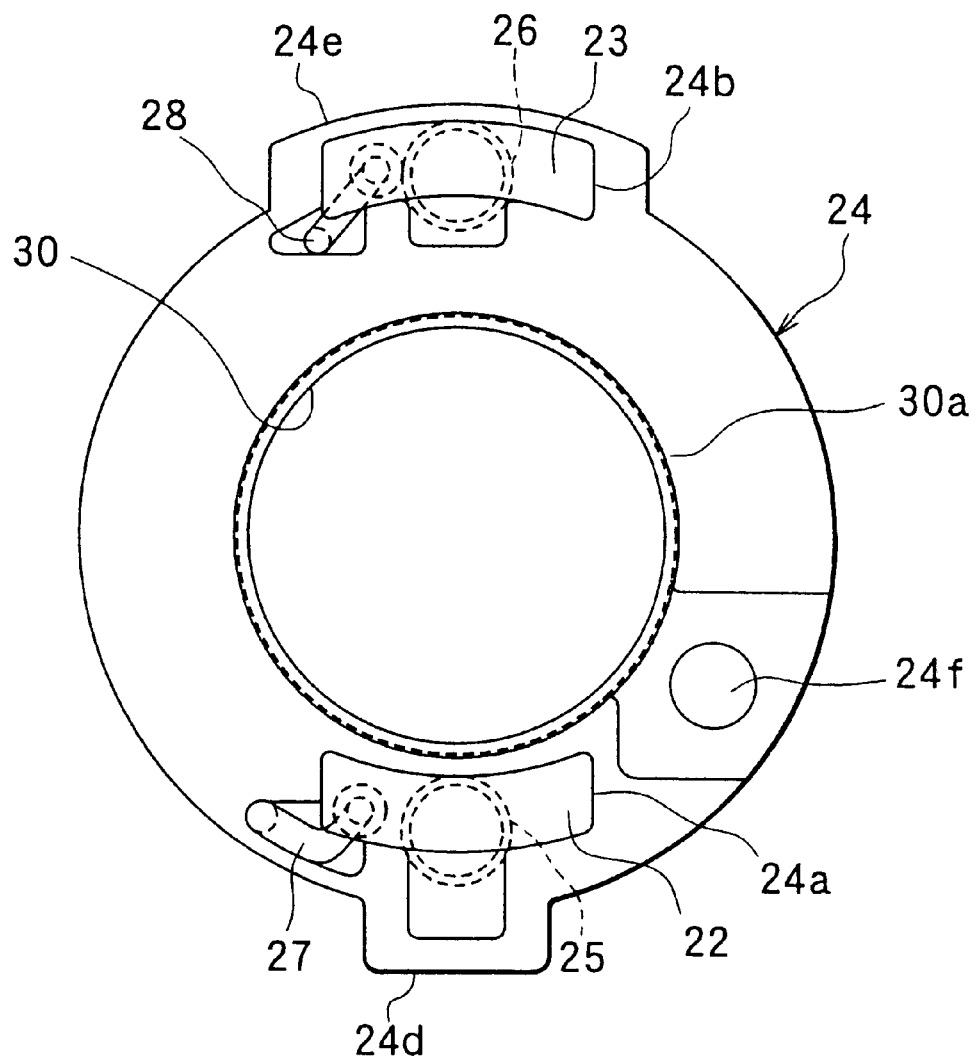
FIG. 4 is a front view showing a brush supporter (second embodiment)
Figure 5:
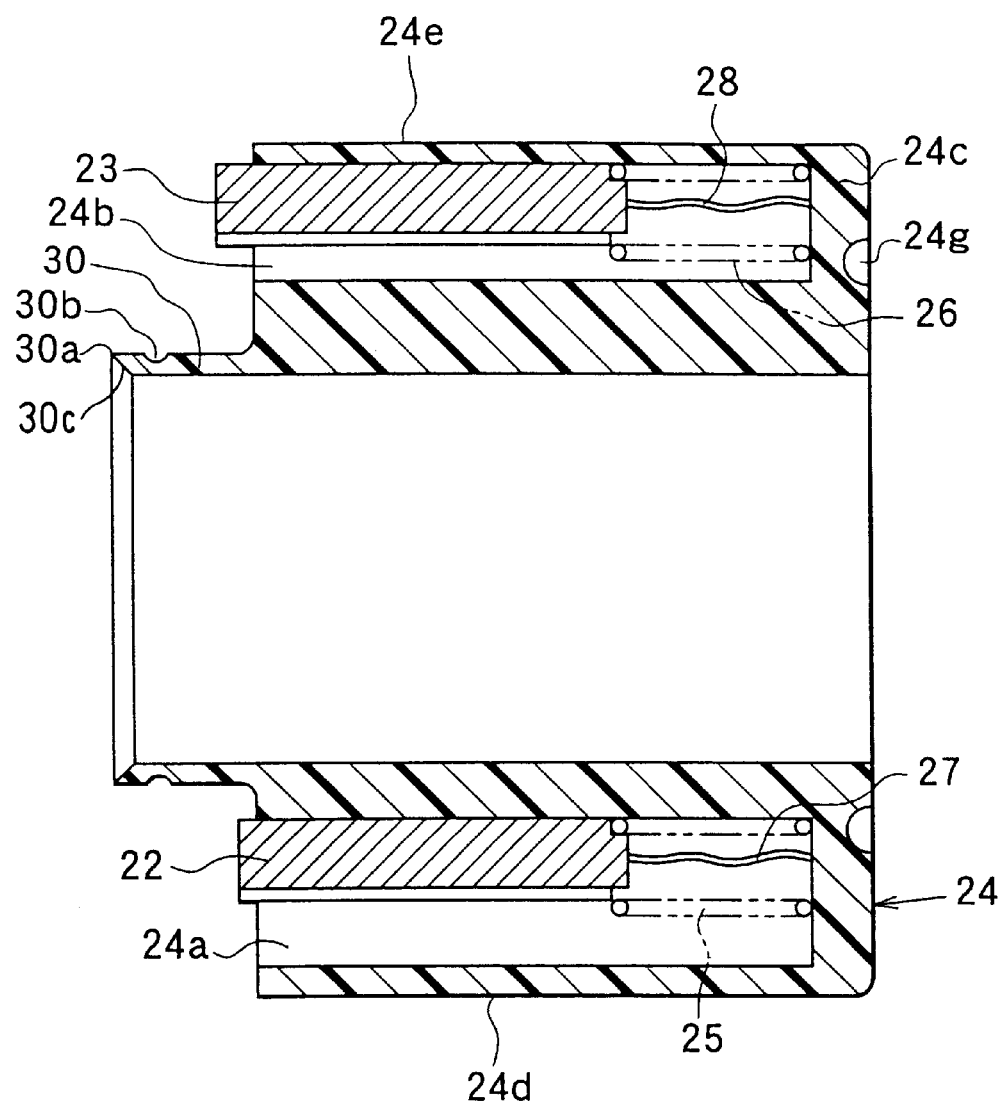
FIG. 5 is a cross-sectional view showing a brush supporter (second embodiment)

In the second embodiment, as shown in FIGS. 4 and 5, the edge 30*a* is formed at the same surface as the outer surface of the main portion of the sleeve 30, and has an inclined surface 30*c* at the inner periphery thereof. Thus, the die is more easily pulled out when the brush supporter 24 is molded.

(Third Embodiment)

Figure 6:
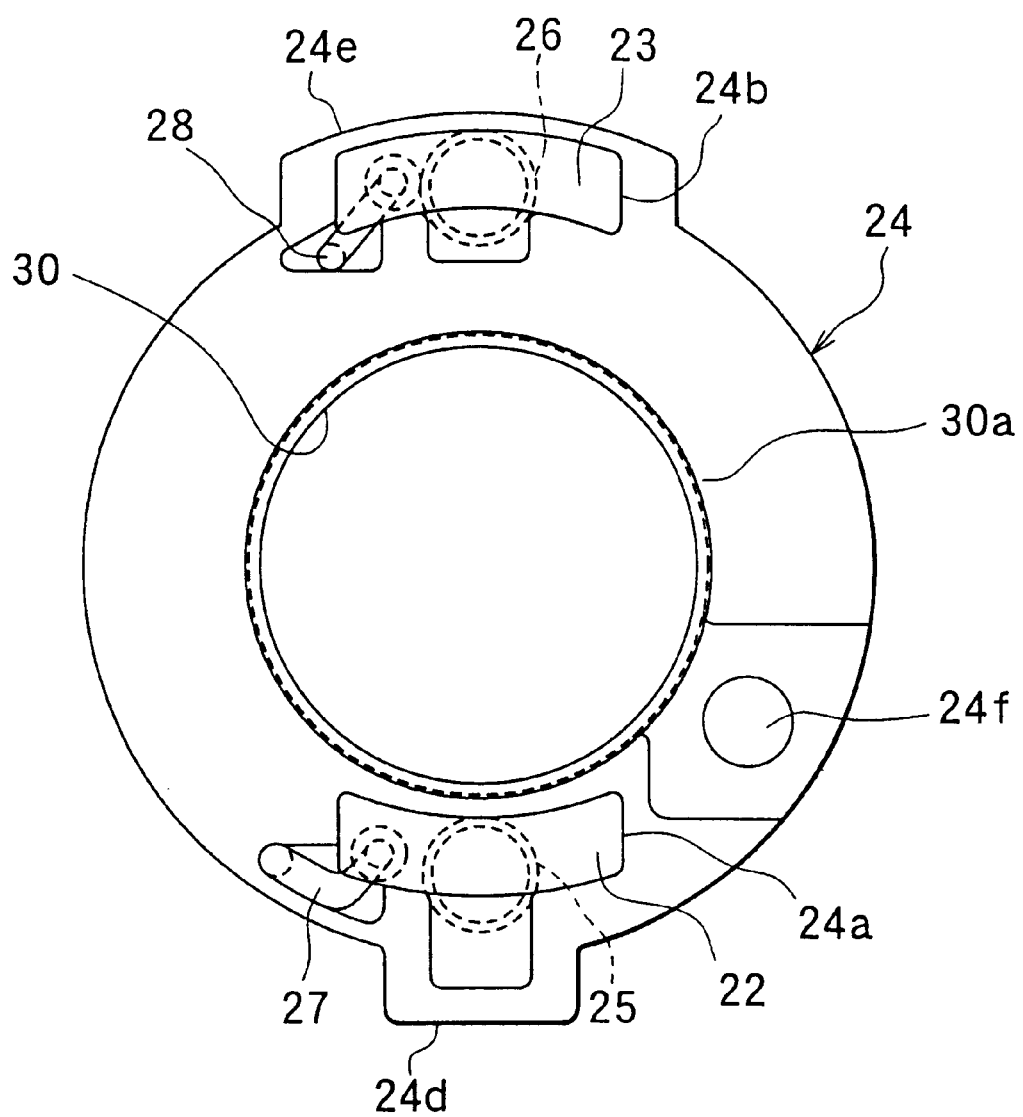
FIG. 6 is a front view showing a brush supporter (third embodiment)
Figure 7:
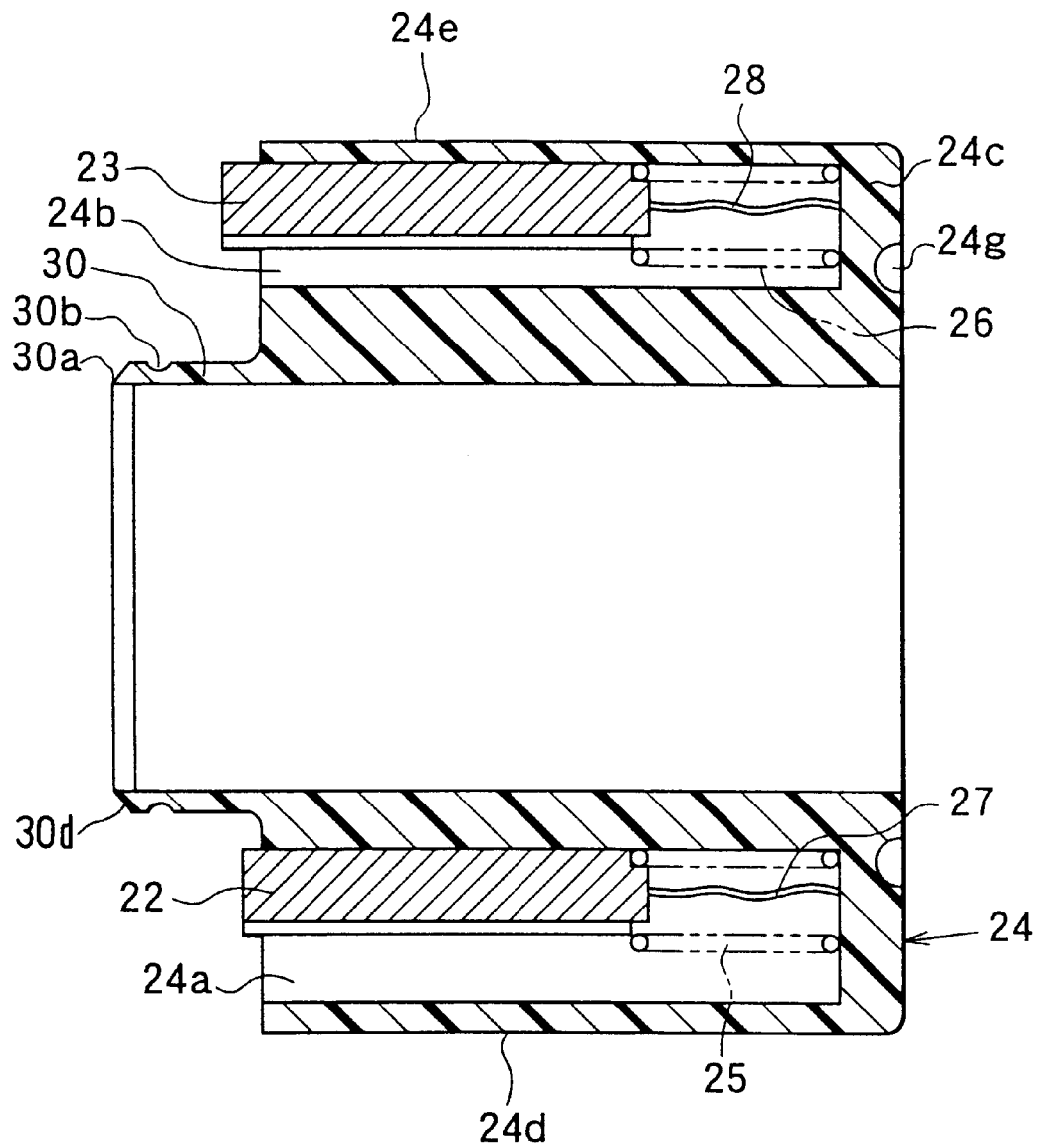
FIG. 7 is a cross-sectional view showing a brush supporter (third embodiment)

In the third embodiment, as shown in FIGS. 6 and 7, the edge 30*a* has an inclined surface 30*d* at the outer periphery thereof.

(Fourth Embodiment)

Figure 8:
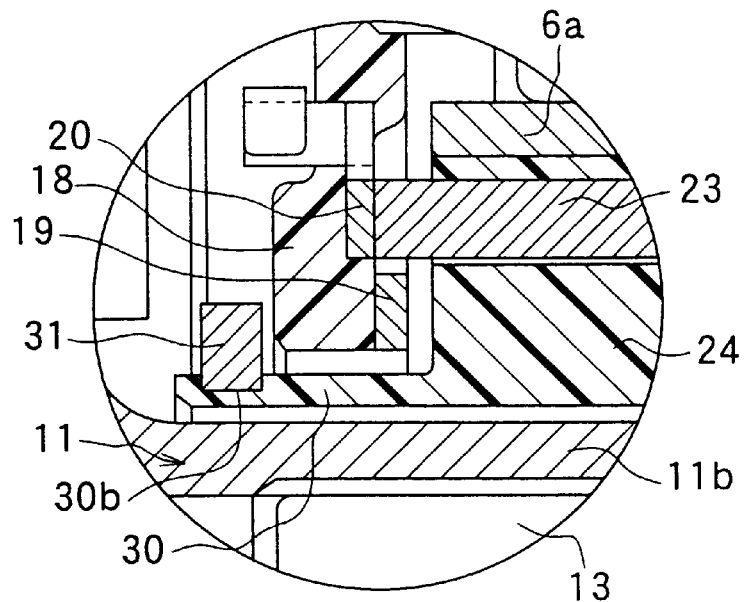
FIG. 8 is a cross-sectional view showing a principal part of an electromagnetic clutch (fourth embodiment)
Figure 9:
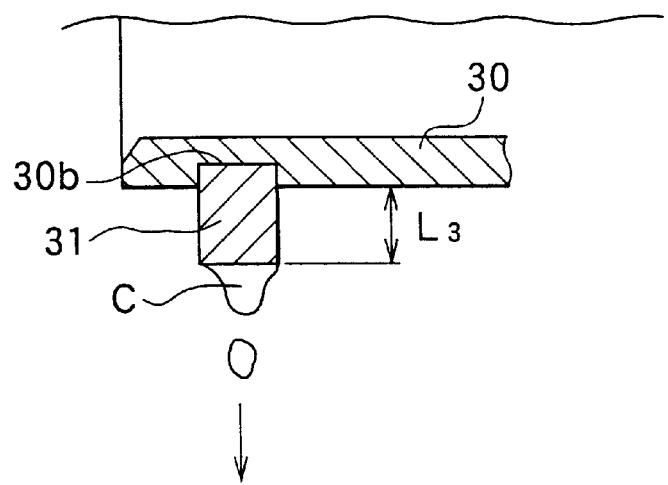
FIG. 9 shows the oil falling in drop from an oil absorber (fourth embodiment).

In the fourth embodiment, as shown in FIGS. 8 and 9, a ring-like oil absorber 31 is installed and adhered in the circle groove 30*b*. The oil absorber 31 is made of a porous material such as felt capable of absorbing and retaining oil. The oil absorber 31 protrudes radially outwardly from the outer surface of the sleeve 30 by a predetermined amount L3.

Thus, even when the leaking oil flows on the outer surface of the sleeve 30 and toward the axial rear side thereof, the oil is absorbed and retained by the oil absorber 31. Then, when the oil absorber 31 becomes saturated, the oil falls in a drop as denoted by C in FIG. 9.

Thus, in the fourth embodiment, the oil is prevented from reaching the brush 22 without forming an edge 30*a* at the front end of the sleeve 30.

(Modifications)

The brushes 22 and 23 need not have a cross-sectional arc shape, and alternatively may be another shape. Further, the brushes 22 and 23 need not be symmetrically disposed at 180 degree intervals, and alternatively may be disposed at any position.

In the above-described embodiments, the present invention is applied to a rotating coil electromagnetic clutch in which the electromagnetic coil 2 is provided in the rotor 1. However, the present invention may alternatively be applied to other rotating coil electromagnetic clutches. In another type of clutch, the electromagnetic coil 2 is provided in the hub 11 connected to the rotation shaft 13 of the compressor 5. The armature 8 is connected to the rotor 1 through the plate spring 9. The armature 8 is coupled with the hub 11 due to the electromagnetic force of the coil 2. The rotation of the rotor 1 is transmitted to the rotational shaft 13 through the armature 8 and the hub 11.

The positions of the positive and negative electrode elements described in the above embodiments may be exchanged with each other.

The layout of electric circuit supplying current to the electromagnetic coil 2 is not restricted to the above-described embodiments.

In the above-described embodiments, the slip-ring rotates and the brushes are fixed. Alternatively, the clutch may have rotating brushes and fixed slip-rings.

What is claimed is:

1. An electromagnetic clutch comprising:
   a rotor;
   an electromagnetic coil disposed in said rotor;
   an armature selectively coupled to said rotor when said electromagnetic coil is energized;
   a fixed member;
   a slip-ring rotating with said rotor;
   a slip-ring supporter fixed to one of said rotor and said fixed member, and supporting said slip-ring;
   a brush supplying electric current to said slip-ring;
   a brush supporter fixed to the opposite one of said rotor and said fixed member than said slip-ring supporter, and supporting said brush, said brush supporter including a substantially cylindrical sleeve inside said brush, which extends axially outwardly farther than a slide surface between said slip-ring and said brush,
   wherein said sleeve includes an edge at an axial end thereof, said edge being formed into a cross-sectional acute angle shape.

2. The electromagnetic clutch according to claim 1, wherein said brush supporter is disposed between an inner periphery of a cylindrical boss portion axially protruding from a housing of a rotary machine and a rotational shaft of the rotary machine.

3. An electromagnetic clutch according to claim 1, wherein said edge protrudes radially outwardly from an outer periphery surface of said sleeve.

4. An electromagnetic clutch according to claim 1, wherein said sleeve includes a circle groove being formed on a rear side of said edge and extending entirely in a circumferential direction of said sleeve.

5. An electromagnetic clutch according to claim 1, further comprising an oil absorber disposed inwardly of an axial end of said sleeve.

6. An electromagnetic clutch according to claim 1, wherein said brush supporter and said sleeve are made of resin and integrally formed.

7. An electromagnetic clutch according to claim 1, further comprising an elastic seal member disposed between a front housing and said brush supporter.

* * * * *